Oct. 15, 1929.  H. S. RIEHL  1,731,439

ANTITHEFT CURTAIN FOR MOTOR VEHICLES

Filed Oct. 16, 1926

Witnesses  
Charles H. Ourand

Inventor  
Harry S. Riehl  
By  
E. G. Siggers  
Attorney

Patented Oct. 15, 1929

1,731,439

UNITED STATES PATENT OFFICE

HARRY S. RIEHL, OF LOUISVILLE, KENTUCKY, ASSIGNOR OF ONE-HALF TO FRED MEYER, OF LOUISVILLE, KENTUCKY

ANTITHEFT CURTAIN FOR MOTOR VEHICLES

Application filed October 16, 1926. Serial No. 142,060.

This invention relates to anti-theft devices for motor vehicles, and has for its general object the provision of an opaque curtain adapted to be moved into obstructing relation to the windshield and to be locked in such position so that it will be impossible for the car to be driven away owing to the inability of the would-be thief to see the roadway.

An important object of the invention is to provide an anti-theft device of this character which is normally concealed beneath the top or roof of the vehicle but readily capable of being pulled down into operative position when desired.

A more specific object is the provision of a safety device of this character formed as a flexible curtain consisting of a plurality of pivotally connected sections or strips travelling along suitable guides so as to be readily movable from one position to another, locking means being provided for securing it in windshied obstructing position.

An additional object is to provide a structure of this character which will be simple and inexpensive to manufacture, easy to apply and operate, positive in action, efficient and durable in service, and a general improvement in the art.

Figure 1:
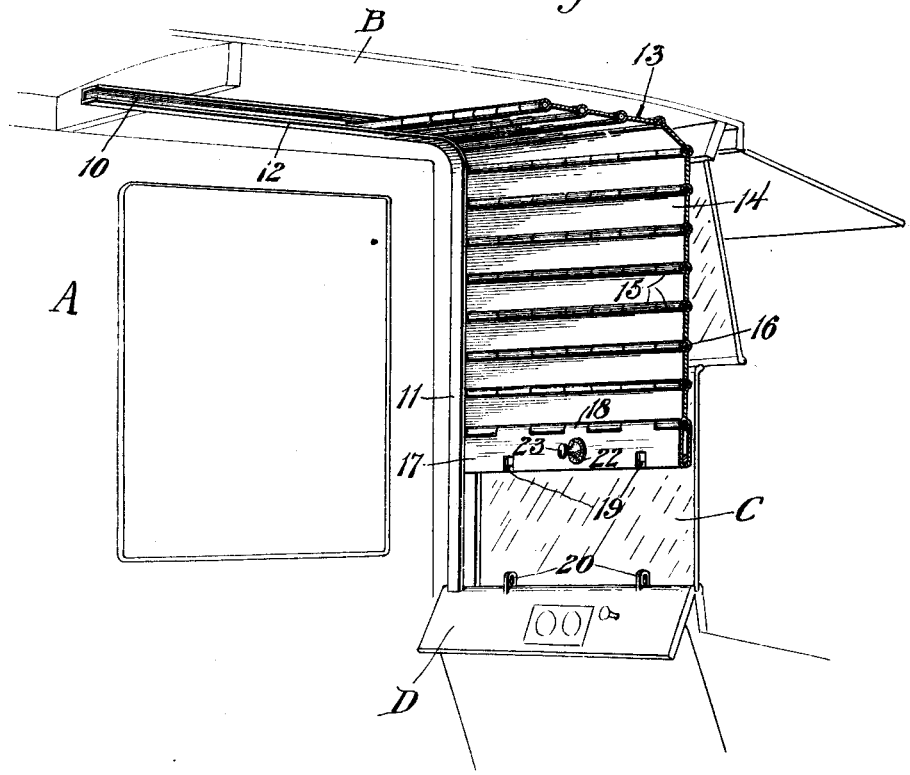
Figure 2:
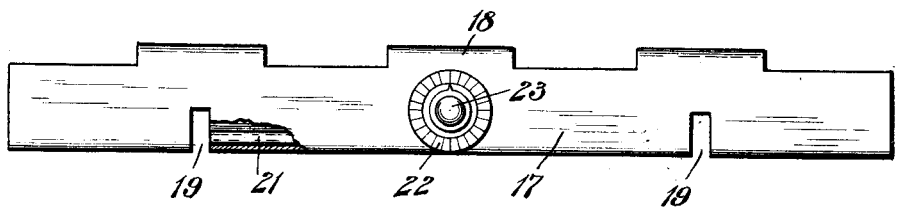

With the above and other objects and advantages in view, the invention preferably consists in the arrangement and combination of parts and detailed structural features to be hereinafter more fully described and claimed, and illstrated in the accompanying drawing, in which:

Figure 1 is a sectional perspective view of the device applied to a motor vehicle, the curtain being shown as drawn partly down, and Figure 2 is a front elevation of the lowermost element or member of the curtain showing the locking means.

Referring more particularly to the drawings, it will be observed that I have illustrated the device as applied to a motor vehicle having a body of the closed type, but it should be distinctly understood that there should be no limitation in this respect as it is conceivable that the invention may be applied to any type of motor vehicle for either pleasure or commercial purposes. In the drawings, the letter A designates a portion of the vehicle body having a roof or top B, a windshield C and instrument board D.

In carrying out the invention I provide a guide 10 at each side of the body, only one being shown in the present instance as such is sufficient for a proper illustration of the invention. The guide 10 is preferably formed as a channel bar, and is of substantially L-shape, the vertical leg or portion 11 being located at the side of the windshield, and the horizontal leg or portion 12 being located beneath the roof or top B. The exact form of guides employed is immaterial and there is likewise no particular limitation as to the means employed for mounting the guides in position. It is, however, preferable that the guides extend to or near the instrument board D as clearly illustrated.

Confined between and slidably mounted along the guides 10 is a flexible curtain designated as a whole by the numeral 13, this curtain being shown as constructed of a plurality of similar metal plates or strips 14 having their edges provided with interfitting buckles 15 pivotally connected by pintle rods 16 or the like. As a matter of fact the detailed construction of the curtain might be varied within considerable limits, though the formation indicated is highly satisfactory for the purpose.

The curtain further includes an end section or member 17 having knuckles 18 pivotally connected between the knuckles 15 on the lowermost one of the plates 14. The section 17 is formed as a shallow casing and has its lower edge provided with notches or recesses 19 adapted to receive staples or apertured ears 20 which project upwardly from the instrument board D or dash. Slidably mounted within the section 17 is a locking bolt 21 normally out of obstructing relation to the recesses or notches 19 but adapted to be projected thereacross and to pass through the staples or apertured ears 20. While it is conceivable that any preferred means might be provided for actuating the locking rod or bar 21, it is preferable to provide a permutation or combination lock which is not shown in detail as the structure thereof may be entirely conventional. Locks of this type of course have a dial and knob indicated in the drawings at 22 and 23, respectively.

In the use of the device, it will be apparent that when the vehicle is in operation by the owner or other authorized person, the curtain 13 is pushed upwardly along the guides 10 so as to be beneath the top or roof of the car in an entirely out of the way position where it will be inconspicuous. When the operator leaves the vehicle and wishes to protect it against theft it is intended that the curtain 13 be pulled down along the guides so as to extend in obstructing relation to the windshield. When this is done, the staples or apertured ears 20 are received within the notches or recesses 19, and the lock is manipulated to project the bolt or bolts 21 across the recesses and through the staples or ears. Clearly, the vehicle cannot be operated in this condition inasmuch as it would be impossible to obtain a view of the roadway except by craning out the side window, an act which would naturally attract attention and probably result in the questioning, if not the actual arrest, of the operator.

Another advantage of the device is that the curtain may be pulled down part way to shield the eyes of the occupant when driving in bright sunlight. The provision of a permutation lock instead of a key-operated lock is of advantage inasmuch as there is less likelihood of the device being opened by a thief, and no danger of inconvenience to the authorized operator of the vehicle inasmuch as there is no key to lose. However, it should be understood that if desired a key-operated lock might be provided.

From the foregoing description and a study of the drawings, it will be apparent that I have thus provided a very simple and yet highly efficient device which will operate to prevent theft of motor vehicles. It is thought that the construction, operation and advantages will be readily apparent to one skilled in the art without further explanation.

While I have shown and described a preferred embodiment of the invention, it should be understood that I reserve the right to make such changes in the form, construction and arrangement of parts as will not depart from the spirit of the invention or the scope of the subjoined claims.

Having thus described the invention, I claim:—

1. An anti-theft device for motor vehicles comprising guides arranged at opposite sides of the windshield and having their upper portions extended beneath the top and toward the rear, a flexible curtain slidable along the guides and formed as a plurality of hingedly connected metallic sections and a casing member connected with the lowermost section, a lock mechanism mounted within said casing member, and having outwardly projectable bolts and keeper elements located at the bottom of the windshield and engageable by said bolts.

2. An anti-theft device for motor vehicles comprising, in combination, a pair of opposed, open-sided guides having their upper portions bent to extend toward the rear of the vehicle and beneath the top thereof; and a flexible metal curtain having its edges slidably mounted in the guides to be moved bodily across either portion of the guides; said curtain being formed of panels marginally hinged together transversely of the vehicle, the lowermost panel being in the form of a casing having open-ended slots in its lower edge; a rotatable member mounted in said casing; locking bolts operable by said member to project same across the slots; and eyes mounted on the instrument board or dash and adapted to receive the bolts, when entered in the open-ended slots, to lock the curtain in obstructing relation to the rear side of the windshield.

In testimony, that I claim the foregoing as my own, I have hereto affixed my signature.

HARRY S. RIEHL.